Patented Nov. 17, 1953

2,659,675

UNITED STATES PATENT OFFICE 2,659,675

METHOD OF STABILIZING FOAM FORMING ON MALT BEVERAGES AND BEVERAGES STABILIZED THEREWITH

Arnold B. Steiner, La Jolla, Calif., assignor to Kelco Company, San Diego, Calif., a corporation of Delaware No Drawing. Application February 18, 1950, Serial No. 145,101

3 Claims. (Cl. 99—48)

1

The purpose of the invention is to provide an agent which, when added to malt beverages in minute quantities, greatly lengthens the persistence of the foam produced in pouring.

Propylene glycol alginate has been proposed for use as an additive to beer and similar malt beverages, to stabilize and lengthen the life of the foam (U. S. Patent 2,478,988 to Wallerstein et al.). The alginate heretofore used for that purpose has been that designed for use as an emulsifying agent in French dressings and the like, and has had approximately the following characteristics:

| | |
|---|---|
| Calcium content as CaO | 2% to 3% weight |
| Viscosity in 2% aqueous solution | 6000/8000 cps. |
| Neutralization as ammonium alginate | 30% to 40% |
| Esterification | 25% to 40% |
| Unreacted acidity | 20% to 45% |
| pH in 2% aqueous solution | 3.4 to 3.6 |

I have discovered that the desired stabilization of foam may be strongly promoted by substituting for the alginate heretofore used a propylene glycol alginate having a quite different set of characteristics, the best results being attained with an alginate having the following tests:

| | |
|---|---|
| Calcium content as CaO | 1.0 to 2.0% weight |
| Viscosity in 2% aqueous solution | 200 to 500 cps. |
| Neutralization as sodium alginate | 15% to 20% |
| Esterification | 65% to 80% |
| Unreacted acidity | 5% to 15% |
| pH in 2% aqueous solution | 4.0 to 5.0 |

As described in United States Patent 2,494,911 to Steiner and McNeely, highly stable glycol alginates can be made by first neutralizing a portion of the carboxyl groups of alginic acid with a suitable alkaline agent (e. g., gaseous or aqueous ammonia, sodium carbonate of trisodium phosphate) and thereafter esterifying a portion of the remaining free carboxyls with propylene or other alkylene oxide. The solubility of the product increases as the proportion of unreacted carboxyls diminishes and in that respect it is a matter of indifference whether the hydrogen of the carboxyl is substituted by an esterifying agent or by an alkali. However, the characteristics which distinguish the alkylene esters from the salts of alginic acid become more marked as the ratio between esterified and neutralized carboxyls increases, and I have found that for the purpose of the instant invention it is important to keep this relation as high as possible and as is consistent with keeping the proportion of unreacted carboxyls at a low value.

2

While Patent 2,494,911 discloses neutralization with either ammonium or sodium, it does not distinguish their several effects. I have now discovered that for the attainment of high degrees of esterification, it is desirable to use a sodium base rather than ammonia, the latter tending, at high esterification rates, to the production of cross linkages by which the water-solubility of the product is reduced.

The specialized, foam-stabilizing product having the second set of tests above set forth may be made by either of two methods, each of which is a modification of general methods described in the original patent. In process "A" the two steps, neutralization and esterification, are conducted in a vehicle of alcohol (e. g., isopropyl alcohol) diluted with water. In process "B" these steps are conducted with water as the sole vehicle.

In the commercial manufacture of the old product, of which the characteristics are set forth in the first table, a relatively high calcium, high viscosity moist alginic acid (about 20% solids, 80% water) is contacted in a rotary drier with gaseous ammonia until from 30% to 40% of the carboxyl groups are reacted to form ammonium alginate. During this step the solids content is increased to about 50% by evaporation of water. The partially neutralized acid is then transferred to a pressure kettle in which it is further reacted with propylene oxide in the proportion 0.5 pound oxide per pound dry weight of original alginic acid, after which the product is dried and ground.

In the "A" process, a moist, low calcium, low viscosity alginic acid at about 20% solids is blended in a power mixer with a quantity of isopropyl alcohol equal in volume to about 50% of the water content of the moist acid. After stirring to form a slurry, 8.45 pounds trisodium phosphate per 100 pounds dry weight of alginic acid is added in the form of a 10% aqueous solution, this quantity being sufficient to neutralize twenty percent of the carboxyl groups of the acid. Sodium carbonate or bicarbonate may be substituted for the phosphate if preferred. The batch is then drained and pressed to expel excess liquid, transferred to a closed kettle and reacted with about 0.9 pound propylene oxide per pound dry weight of original alginic acid. The product of this two step treatment has the following characteristics:

| | |
|---|---|
| Calcium content as CaO | 1.0% to 2% |
| Viscosity in 2% aqueous solution | 200 to 500 cps. |
| Neutralization as sodium alginate | 20% |
| Esterification | 65% to 75% |
| Unreacted acidity | 5% to 15% |
| pH in 2% aqueous solution | 4.0 to 5.0 |

In the "B" process, a moist, low calcium, low viscosity alginic acid at about 20% solids, 80% water is mixed thoroughly with 10% aqueous solution of trisodium phosphate in quantity equal to 6.3 pounds of the sodium salt per 100 pounds dry weight alginic acid, a quantity sufficient to neutralize fifteen percent of the carboxyl groups of the acid. The product is dried to about 50% solids, transferred to a closed kettle and further treated with 1 pound propylene oxide per pound dry weight original acid. The product has the following characteristics:

Calcium content as CaO _____ 1.0% to 2%
Viscosity in 2% aqueous solution __ 200 to 500 cps.
Neutralization as sodium alginate _____ 15%
Esterification _____ 70% to 80%
Unreacted acidity _____ 5% to 15%
pH in 2% aqueous solution _____ 4.0 to 5.0

The following experiment illustrates the effect on the foam stability of beer produced by the addition of 50 parts per million of, respectively, the old product when made at high viscosity and at low viscosity and the new products of the "A" and "B" processes. In this experiment the beer, after filtration and before carbonation, was treated with the stated quantity of the alginate in the form of a 1% aqueous solution and was then carbonated with 2.7 volumes of carbon dioxide per volume of beer, carefully mixed and chilled over night to about 40° Fahr. The chilled beers were then poured into cylindrical graduates and the volume of foam in percents of the final volume of liquid were read after five minutes and at intervals thereafter. The results of this experiment are shown in the following table:

| Elapsed time, minutes | 5 | 15 | 20 | 25 | 30 |
|---|---|---|---|---|---|
| | Percent | Percent | Percent | Percent | Percent |
| Control, no addition | 97 | 21 | 2 | 0 | 0 |
| Old product, high viscosity | 108 | 27 | 17 | 5 | 0 |
| Old product, low viscosity | 110 | 29 | 17 | 8 | 0 |
| New product, "B" process | 103 | 56 | 39 | 21 | 8 |
| New product, "A" process | 113 | 68 | 41 | 23 | 12 |

These comparisons show clearly that while the old product has a material effect in foam stabilization, the new product is strikingly more effective for that purpose.

The rationale of foam stabilization by propylene glycol alginate is entirely unknown to me, but I have found by experience that to produce the best results the product must have the following characteristics:

a. Complete water solubility;
b. A low calcium content, not to exceed 2.0% by weight as calcium oxide and preferably about 1.5%;
c. A low viscosity, not exceeding 500 centipoises in 2% aqueous solution;
d. A hydrogen ion concentration in 2% aqueous solution not less than pH 4.0 and preferably pH 4.5 or over;
e. Not less than 15% nor more than 20% of the carboxyl groups of the alginic acid should be neutralized with sodium;
f. Not less than 65% of the carboxyl groups should be esterified with the propylene glycol groups;
g. Not more than 15% of the carboxyl groups should remain unreacted.

In preparing the product we prefer to use the "A" process above described, both as being slightly more economical in the use of propylene oxide and as yielding a product which is appreciably more effective in foam stabilization than the product of the "B" process. The difference is illustrated in the experiment above described and is still more marked in large quantity, commercial application.

The quantity of the improved product which may be added to beer to produce foam stabilization varies from 25 parts per million upwardly, sufficient effect ordinarily being produced with an addition of 40 to 50 parts per million by weight. The addition of even a very large excess over the required quantity is harmless other than as being wasteful, and no undesirable secondary effect is produced by the addition of even 500 parts per million. The alginate may be added to the beer either before or after filtration, as may be most convenient.

I claim as my invention:

1. The method of stabilizing the foam forming on malt beverages, which comprises dispersing in alcohol a moist, low viscosity alginic acid having a calcium content, as calcium oxide, not exceeding 2% by weight; adding to said dispersion from $15/100$ to $20/100$ of one stoichiometric equivalent of a basic sodium compound and thereby neutralizing from 15% to 20% of the carboxyl groups of said acid; expressing the alcoholic liquid from the partially neutralized acid and thereby substantially removing the alcohol-soluble impurities normally present in alginic acid; treating the resultant purified and partially neutralized acid with propylene oxide in excess of the stoichiometric equivalent of the carboxyl groups remaining free after said neutralization, and continuing said treatment until not less than 65% of the original carboxyl groups have been esterified, and adding the resulting product in relatively small amounts to the beverage whereby the persistence of the foam in pouring is lengthened.

2. A foam-forming malt beverage containing a relatively small amount of propylene glycol alginate characterized by complete solubility in water; a viscosity not exceeding 500 centipoises in 2% aqueous solution; a hydrogen ion content in 2% aqueous solution not less than 4.0 pH; a calcium content not exceeding 2.0% as calcium oxide; from 15% to 20% of the carboxyl groups of said alginate being combined with sodium; not less than 65% of said carboxyl groups being esterified with the propylene glycol group, and not more than 15% of said carboxyl groups being free and uncombined whereby the persistence of the foam in pouring is lengthened.

3. A foam-forming malt beverage containing a product as described in claim 2, further characterized by substantial freedom from alcohol-soluble impurities normally present in alginic acid.

ARNOLD B. STEINER.

References Cited in the file of this patent

UNITED STATES PATENTS

| Number | Name | Date |
|---|---|---|
| 2,426,125 | Steiner | Aug. 19, 1947 |
| 2,478,988 | Wallerstein et al. | Aug. 16, 1949 |
| 2,494,912 | Steiner et al. | Jan. 17, 1950 |